(12) United States Patent
Hosudurg et al.

(10) Patent No.: US 12,530,252 B2
(45) Date of Patent: Jan. 20, 2026

(54) SYSTEMS AND METHODS FOR IDENTIFYING SOLUTIONS FOR ERRORS IN LOG FILES OBTAINED FROM EXECUTION ENVIRONMENTS

(71) Applicant: Tata Consultancy Services Limited, Mumbai (IN)

(72) Inventors: Anantha Desik Puranam Hosudurg, Hyderabad (IN); Sumiran Naman, Pune (IN); Ashim Roy, Pune (IN); Naga Basava Raju Padmanabhuni, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 458 days.

(21) Appl. No.: 18/060,368

(22) Filed: Nov. 30, 2022

(65) Prior Publication Data

US 2023/0297458 A1 Sep. 21, 2023

(30) Foreign Application Priority Data

May 18, 2022 (IN) .............................. 202221028622

(51) Int. Cl.
*G06F 11/07* (2006.01)
*G06F 18/22* (2023.01)
(Continued)

(52) U.S. Cl.
CPC ...... *G06F 11/0793* (2013.01); *G06F 11/0709* (2013.01); *G06F 11/0751* (2013.01);
(Continued)

(58) Field of Classification Search
CPC ............. G06F 11/0769; G06F 11/0787; G06F 11/079; G06F 11/0793; G06F 40/284;
(Continued)

(56) References Cited

U.S. PATENT DOCUMENTS

| | | | |
|---|---|---|---|
| 11,226,858 B1* | 1/2022 | Srivastava | G06F 11/079 |
| 2020/0159640 A1* | 5/2020 | Sato | G06F 11/3065 |
| 2021/0191798 A1* | 6/2021 | Zhang | G06F 11/3476 |

FOREIGN PATENT DOCUMENTS

| | | |
|---|---|---|
| CN | 109948143 A | 6/2019 |
| CN | 114077663 A | 2/2022 |

OTHER PUBLICATIONS

Xi, Lanlan, et al., Anomaly Detection Mechanism Based on Hierarchical Weights through Large-Scale Log Data, International Conference on Computer Communication and Artificial Intelligence (CCAI), May 2021, 10 pages, [retrieved on Mar. 6, 2025], Retrieved from the Internet: <URL:http://ieeexplore.ieee.org/>.*

(Continued)

*Primary Examiner* — Geoffrey R St Leger
(74) *Attorney, Agent, or Firm* — Finnegan, Henderson, Farabow, Garrett & Dunner, LLP (57) ABSTRACT

In the DevOps process, testing teams use automated testcases to test a product in a regression testing running daily, which generate thousands of log files per run, in various distributed environment with different formats. Solutions to errors depend on SMEs and the impact of solution leads to rework of defect/errors and high degree of heterogeneity. This leads to huge bottleneck in automation of DevOps process leading to loss of productivity and agility. Present disclosure addresses the challenges by providing systems and methods that auto capture the log files of different formats efficiently in a scalable, extendible, and plug-able way. The system then mines and parses the log files based on given identifiers to standardize and de-duplicate to create unique error records with detail description including cause, position, module, timestamp, etc. The system predicts the (Continued)

solutions leveraging the database containing solutions and errors by using a modified Smooth Inverse Frequency technique.

20 Claims, 2 Drawing Sheets

(51) Int. Cl.
  *G06F 40/205* (2020.01)
  *G06F 40/279* (2020.01)
  *G06F 40/284* (2020.01)

(52) U.S. Cl.
  CPC ...... *G06F 11/0769* (2013.01); *G06F 11/0778* (2013.01); *G06F 11/0787* (2013.01); *G06F 11/079* (2013.01); *G06F 18/22* (2023.01); *G06F 40/205* (2020.01); *G06F 40/279* (2020.01); *G06F 40/284* (2020.01)

(58) Field of Classification Search
  CPC ...... G06F 40/205; G06F 40/279; G06F 8/423; G06F 8/425; G06F 8/427
  See application file for complete search history.

(56) References Cited

OTHER PUBLICATIONS

Pande, Amit, et al., WEAC: Word Embeddings for Anomaly Classification from Event Logs, IEEE International Conference on Big Data (Big Data), Dec. 2017, 6 pages, [retrieved on Mar. 6, 2025], Retrieved from the Internet: <URL:http://ieeexplore.ieee.org/>.*
Tharindu Ranasinghe et al., "Enhancing Unsupervised Sentence Similarity Methods with Deep Contextualised Word Representations," Proceedings of the International Conference on Recent Advances in Natural Language Processing, 2019, ACL Anthology, https://aclanthology.org/R19-1115.pdf.

* cited by examiner

SYSTEMS AND METHODS FOR IDENTIFYING SOLUTIONS FOR ERRORS IN LOG FILES OBTAINED FROM EXECUTION ENVIRONMENTS

PRIORITY CLAIM

This U.S. patent application claims priority under 35 U.S.C. § 119 to: Indian Patent Application No. 202221028622, filed on May 18, 2022. The entire contents of the aforementioned application are incorporated herein by reference.

TECHNICAL FIELD

The disclosure herein generally relates to analysis of log files from execution environments, and, more particularly, to systems and methods for identifying solutions for errors in log files obtained from execution environments.

BACKGROUND

In the DevOps process, testing teams use thousands of automated testcases to test a product in a regression testing running daily. The testing suite of such number of testcases generates thousands of log files per run, in various distributed environment with different formats (log4j, Server logs, Process logs, etc.). Every day, several testers consolidate the errors that occurred in that run by manually scavenging the log files. The respective developers/subject matter experts (SMEs) also had to manually scan the log files apart from the testing report to provide solutions to the errors/defects. The solutions depend on SMEs and the impact of solution in many cases lead to rework of the defect/errors and high degree of heterogeneity. This leads to huge bottleneck in automation of DevOps process leading to loss of productivity and agility.

SUMMARY

Embodiments of the present disclosure present technological improvements as solutions to one or more of the above-mentioned technical problems recognized by the inventors in conventional systems.

For example, in one aspect, there is provided a processor implemented method for identifying solutions for errors in log files obtained from execution environments. The method comprises obtaining, via one or more hardware processors, a plurality of log files from at least one of a first execution environment, and a second execution environment, wherein the plurality of log files correspond to one or more file formats; pre-processing, via the one or more hardware processors, the plurality of log files to obtain a plurality of pre-processed log files comprising one or more unique error sentences; tokenizing, via the one or more hardware processors, the one or more unique error sentences by using a Natural Language Processing (NLP) library; removing, via the one or more hardware processors, stop words comprised in the one or more unique error sentences; calculating, via the one or more hardware processors, a frequency of each word comprised in the one or more unique error sentences; calculating, by using a word vector model via the one or more hardware processors, a word weight for each word comprised in the one or more unique error sentences based on the calculated frequency; generating, via the one or more hardware processors, one or more error sentence vectors for the one or more unique error sentences using the calculated word weight for each word; computing, via the one or more hardware processors, a cosine similarity between the one or more unique error sentence vectors of the plurality of log files and a plurality of error sentence vectors comprised in a pre-defined database, by using a modified Smooth Inverse Frequency (mSIF) model to obtain a set of matched cosine similarities; performing, via the one or more hardware processors, a comparison of each cosine similarity comprised in the set of matched cosine similarities with a pre-defined threshold value; and identifying, via the one or more hardware processors, one or more solutions to the one or more unique error sentences based on the comparison.

In an embodiment, the first execution environment and the second execution environment are different from each other.

In an embodiment, the one or more of solutions are identified for the one or more unique error sentences when the cosine similarity is greater than or equal to the pre-defined threshold value.

In an embodiment, the one or more unique error sentence vectors are generated based on an equation: $v(s)=a/(a+p(w))*v(w)$, and wherein v is average number of words present in each sentence, $v(w)$ is a vector representation of a word, $p(w)$ is number of times a word has occurred by the total number of words, a is a smoothing hyper-parameter calculated based on a first pre-defined variable $\alpha$, and a second pre-defined variable z, $\alpha$ is (a) computed based on a sum of (i) $p(w)$ and (ii) v and total number of words in the pre-defined database or (b) empirically determined.

In an embodiment, the cosine similarity is computed as a simple mean of projection weight vectors of the one or more unique error sentences and the one or more error sentence vectors for each sentence vector comprised in the pre-defined database.

In an embodiment, the modified Smooth Inverse Frequency (mSIF) model is obtained by: removing stops words from the plurality of error sentences by removing one or more influential non-relevant words comprised in the plurality of error sentences; calculating a frequency of each word comprised in the plurality of error sentences; calculating, by using a word vector model, a word weight for each word comprised in the plurality of error sentences based on the calculated frequency; and generating one or more error sentence vectors for the plurality of error sentences using the calculated word weight for each word to obtain the modified Smooth Inverse Frequency (mSIF) model.

In another aspect, there is provided a processor implemented system for identifying solutions for errors in log files obtained from execution environments. The system comprises: a memory storing instructions; one or more communication interfaces; and one or more hardware processors coupled to the memory via the one or more communication interfaces, wherein the one or more hardware processors are configured by the instructions to: obtain a plurality of log files from at least one of a first execution environment, and a second execution environment, wherein the plurality of log files correspond to one or more file formats; pre-process the plurality of log files to obtain a plurality of pre-processed log files comprising one or more unique error sentences; tokenize the one or more unique error sentences by using a Natural Language Processing (NLP) library; remove stop words comprised in the one or more unique error sentences; calculate a frequency of each word comprised in the one or more unique error sentences; calculating, by using a word vector model via the one or more hardware processors, a word weight for each word comprised in the one or more unique error sentences based on the calculated frequency;

generate one or more error sentence vectors for the one or more unique error sentences using the calculated word weight for each word; compute a cosine similarity between the one or more unique error sentence vectors of the plurality of log files and a plurality of error sentence vectors comprised in a pre-defined database, by using a modified Smooth Inverse Frequency (mSIF) model to obtain a set of matched cosine similarities; perform a comparison of each cosine similarity comprised in the set of matched cosine similarities with a pre-defined threshold value; and identify one or more solutions to the one or more unique error sentences based on the comparison.

In an embodiment, the first execution environment and the second execution environment are different from each other.

In an embodiment, the one or more of solutions are identified for the one or more unique error sentences when the cosine similarity is greater than or equal to the pre-defined threshold value.

In an embodiment, the one or more unique error sentence vectors are generated based on an equation: $v(s)=a/(a+p(w))*v(w)$, and wherein v is average number of words present in each sentence, $v(w)$ is a vector representation of a word, $p(w)$ is number of times a word has occurred by the total number of words, a is a smoothing hyper-parameter calculated based on a first pre-defined variable $\alpha$, and a second pre-defined variable z, $\alpha$ is (a) computed based on a sum of (i) $p(w)$ and (ii) v and total number of words in the pre-defined database or (b) empirically determined.

In an embodiment, the cosine similarity is computed as a simple mean of projection weight vectors of the one or more unique error sentences and the one or more error sentence vectors for each sentence vector comprised in the pre-defined database.

In an embodiment, the modified Smooth Inverse Frequency (mSIF) model is obtained by: removing stops words from the plurality of error sentences by removing one or more influential non-relevant words comprised in the plurality of error sentences; calculating a frequency of each word comprised in the plurality of error sentences; calculating, by using a word vector model, a word weight for each word comprised in the plurality of error sentences based on the calculated frequency; and generating one or more error sentence vectors for the plurality of error sentences using the calculated word weight for each word to obtain the modified Smooth Inverse Frequency (mSIF) model.

In yet another aspect, there are provided one or more non-transitory machine-readable information storage mediums comprising one or more instructions which when executed by one or more hardware processors cause identifying solutions for errors in log files obtained from execution environments by obtaining a plurality of log files from at least one of a first execution environment, and a second execution environment, wherein the plurality of log files correspond to one or more file formats; pre-processing the plurality of log files to obtain a plurality of pre-processed log files comprising one or more unique error sentences; tokenizing the one or more unique error sentences by using a Natural Language Processing (NLP) library; removing stop words comprised in the one or more unique error sentences; calculating a frequency of each word comprised in the one or more unique error sentences; calculating, by using a word vector model, a word weight for each word comprised in the one or more unique error sentences based on the calculated frequency; generating one or more error sentence vectors for the one or more unique error sentences using the calculated word weight for each word; computing a cosine similarity between the one or more unique error sentence vectors of the plurality of log files and a plurality of error sentence vectors comprised in a pre-defined database, by using a modified Smooth Inverse Frequency (mSIF) model to obtain a set of matched cosine similarities; performing a comparison of each cosine similarity comprised in the set of matched cosine similarities with a pre-defined threshold value; and identifying one or more solutions to the one or more unique error sentences based on the comparison.

In an embodiment, the first execution environment and the second execution environment are different from each other.

In an embodiment, the one or more of solutions are identified for the one or more unique error sentences when the cosine similarity is greater than or equal to the pre-defined threshold value.

In an embodiment, the one or more unique error sentence vectors are generated based on an equation: $v(s)=a/(a+p(w))*v(w)$, and wherein v is average number of words present in each sentence, $v(w)$ is a vector representation of a word, $p(w)$ is number of times a word has occurred by the total number of words, a is a smoothing hyper-parameter calculated based on a first pre-defined variable $\alpha$, and a second pre-defined variable z, $\alpha$ is (a) computed based on a sum of (i) $p(w)$ and (ii) v and total number of words in the pre-defined database or (b) empirically determined.

In an embodiment, the cosine similarity is computed as a simple mean of projection weight vectors of the one or more unique error sentences and the one or more error sentence vectors for each sentence vector comprised in the pre-defined database.

In an embodiment, the modified Smooth Inverse Frequency (mSIF) model is obtained by: removing stops words from the plurality of error sentences by removing one or more influential non-relevant words comprised in the plurality of error sentences; calculating a frequency of each word comprised in the plurality of error sentences; calculating, by using a word vector model, a word weight for each word comprised in the plurality of error sentences based on the calculated frequency; and generating one or more error sentence vectors for the plurality of error sentences using the calculated word weight for each word to obtain the modified Smooth Inverse Frequency (mSIF) model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

In the DevOps process, testing teams use thousands of automated testcases to test a product in a regression testing running daily, which generate thousands of log files per run, in various distributed environment with different formats. Errors are consolidated and subject matter experts (SMEs) have to manually scan the log files apart from the testing report to provide solutions to the errors/defects. The solutions depend on SMEs and the impact of solution in many cases lead to rework of the defect/errors and high degree of heterogeneity. This leads to huge bottleneck in automation of DevOps process leading to loss of productivity and agility.

Embodiments of the present disclosure address the challenges by providing systems and methods that auto capture the log files of different formats (log4j, Jenkins, Maven, HTML, etc.) efficiently in a scalable, extendible, and pluggable way. The system then mines and parses the log files based on given identifiers to standardize and de-duplicate to create unique error records with detail description including cause, position, module, timestamp, etc. The system predicts the solutions leveraging the knowledge base by using natural language processing (NLP) techniques (MSiF or mSIF) which is faster and accurate from the known algorithms. The system stores the processed log files in a structured log files platform so that any customizable report can be generated. The system and method as implemented by the present disclosure bring automated, intelligent, homogeneous integrated log analysis solution in every stage of distributed or non-distributed DevOps environment.

Figure 1:
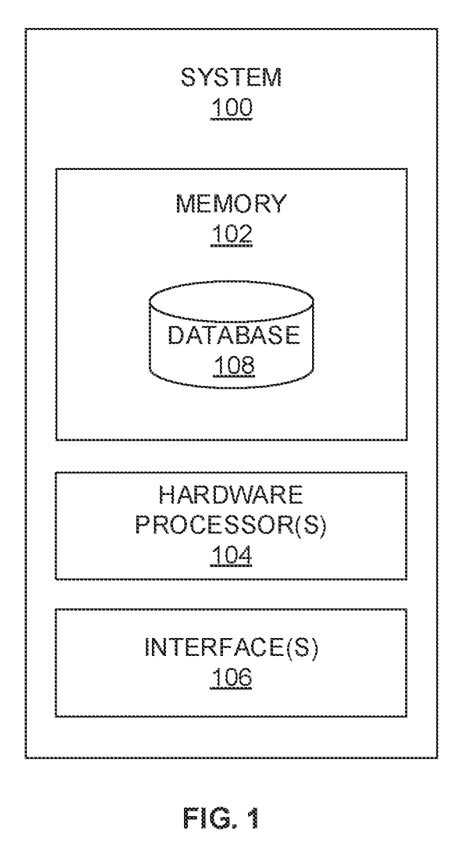
FIG. 1 depicts an exemplary system for identifying solutions for errors in log files obtained from execution environments, in accordance with an embodiment of the present disclosure.
Figure 2:
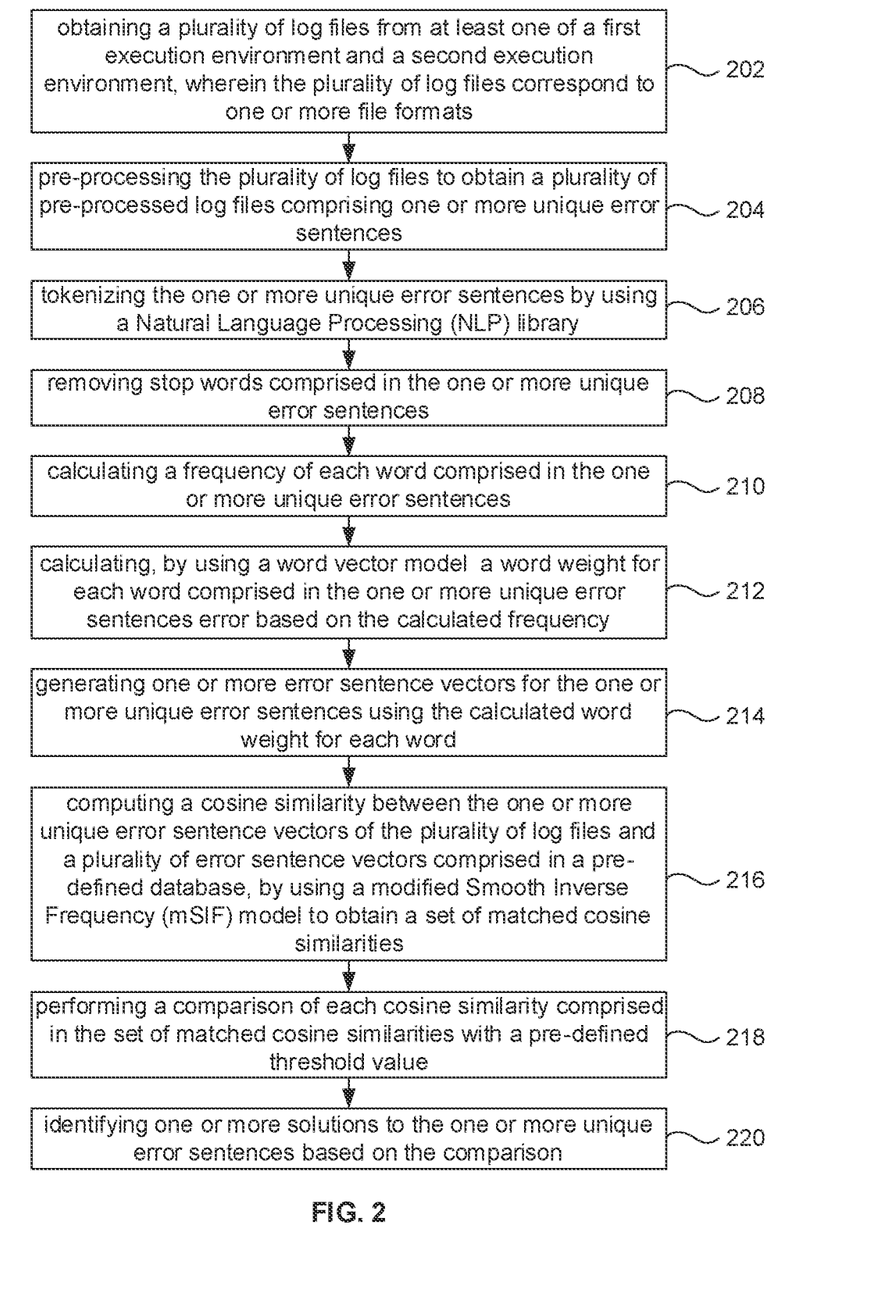
FIG. 2 depicts an exemplary flow chart illustrating a method for identifying solutions for errors in log files obtained from execution environments, using the system of FIG. 1, in accordance with an embodiment of the present disclosure.

Referring now to the drawings, and more particularly to FIG. 1 through 2, where similar reference characters denote corresponding features consistently throughout the figures, there are shown preferred embodiments and these embodiments are described in the context of the following exemplary system and/or method.

FIG. 1 depicts an exemplary system for identifying solutions for errors in log files obtained from execution environments, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information such as a plurality of log files, execution environments, a plurality of pre-processed log files, unique error records (also referred as unique error sentences and interchangeably used herein), corresponding unique error sentence vectors (also referred as vectors and interchangeably used herein), cosine similarities computed for vectors, pre-defined threshold, one or more solutions for the unique errors, and the like. The database 108 further comprises a modified Smooth Inverse Frequency (mSIF/MSiF) model, other pre-processing techniques, and the like. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

FIG. 2 depicts an exemplary flow chart illustrating a method for identifying solutions for errors in log files obtained from execution environments, using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, and the flow diagram as depicted in FIG. 2.

At step 202 of the method of the present disclosure, the one or more hardware processors 104 obtain a plurality of log files from at least one of a first execution environment and a second execution environment. In an embodiment, the plurality of log files corresponds to one or more file formats. The first execution environment and the second execution environment are different from each other, in one example embodiment. Executable files can be generated in two types of environments:

1. Distributed execution environment: Application is deployed on multiple machines, but the testing is done for all the instances simultaneously. The logs (or log files) are generated for different cases on different machine but belong to single testing execution cycle. Multiple processes of one instance of testing cycle can run in parallel on multiple machines simultaneously. For example, One Machine can have Windows® operating system installation and some specific features of product, whereas other machine is Linux® operating system and has different product features.

2. Non-distributed execution environment: The application is deployed on single machine and is tested also on the same machine. The logs generated in such cases are present in that single execution environment.

Below are few examples of log files obtained from various execution environments. Such exemplary log files shall not be construed as limiting the scope of the present disclosure.

1. Type of Logfile—Log4j, Format type—.log file
Information contained in the log files:
15-Oct-2020 18:29:11 398809 ERROR—Mask Mplus: 110—Process failed for execution id:22902. Schema name and catalog name is null for mplussource
15-Oct-2020 18:29:13 401490 DEBUG—com.abc.mplus.beans.exception.DSException: Schema name and catalog name is null for mplussource
at com.abc.mplus.services.common.maskerutils.MplusMaskerUtility.populateModel(MplusMaskerUtility.java:927)
at com.abc.mplus.services.common.maskerutils.MplusMaskerUtility.addMplusbase(MplusMaskerUtility.java:826)
at com.abc.mplus.services.common.maskerutils.MplusMaskerUtility.addMplusBaseToProject(MplusMaskerUtility.java:532)
at com.abc.mplus.services.mask.MaskMplusServiceProvider.setupServiceSetting(MaskMplusServiceProvider.java:652)
at com.abc.mplus.services.common.maskerutils.MplusMaskerUtility.init(MplusMaskerUtility.java:327)
at com.abc.mplus.services.mask.MaskMplusServiceProvider.processInputs(MaskMplusServiceProvider.java:431)
at com.abc.mplus.services.common.framework.ServiceProvider$ServiceRunner.run(ServiceProvider.java:189).
. . .
Caused by: java.io.FileNotFoundException: D:\Privacy\PrivacyNew\plugins\techniques\Randomization\mplusset\LDs1_75 2693576_STRING.ds (The system cannot find the file specified)
at java.io.FileInputStream.open0(Native Method)
at java.io.FileInputStream.open(FileInputStream.java:195)
at java.io.FileInputStream.<init>(FileInputStream.java:138)
at java.io.FileInputStream.<init>(FileInputStream.java:93)
at java.io.FileReader.<init>(FileReader.java:58)
at com.abc.masketeer.server.utils.ExcelMplusMaskingReportGenerator.getTech ParamsProperty(ExcelMplusMaskingReportGenerator.java:1518)
. . . 56 more
15-Oct-2020 18:29:13 401723 ERROR—Mask Mplus: 110—Process failed for execution id:7112638.

2. Type of Logfile—Jenkins, Format type—.log file
Information contained in the log files:
Started by upstream project "[8mha:////4Fk2OkR/87VpLVsfCp82JJzY5FaT8IQzhwdkNkU9+Wy7AAAAqB+LCAAAAAAAAP9b85aBtbiIQTGjNKU4P08vOT+vOD8nVc83PyU1x6OyILUoJ zMv2y+/JJUBAhiZGBgqihhk0NSjKDWzXb3RdILBUSYGJk8GtpzUvPSSDB8 G5tKinBIGIZ+sxLJE/ZzEvHT94JKizLx0a6BxUmjGOUNodHsLgAyxEg YZ/az8 JH2XxJLEgJzS4viAzIJUn8y81PiwzNRyfQDT/GY-COQAAAA==[0mMplusPlus_PipeLine_View" build number [8mha:////4MMJ2vahRk8ESXF0wJqWqDkyLSRwrKsfGfyFKnBeFsZkAAAArB+LCAAAAAAAAP9b85aBtbiIQTGjNKU4P08vOT+vOD8nVc83PyU1x6OyILUo JzMv2y+/JJUBAhiZGBgqihhk0NSjKDWzXb3RdILBUSYGJk 8GtpzUvPSSDB8 G5tKinBIGIZ+sxLJE/ZzEvHT94JKizLx0a6BxUmjGOUNodHsLgAyWEg YF/az 8JH2XxJLEgJzS4viAzIJUn8y81PiwzNRyfUMDcy MAh2gsVtUAAAA=[0m1072
originally caused by:
Started by timer
Building in workspace C:\Users\172049\.jenkins\workspace\MplusPlus_Main
Checking out a fresh workspace because C:\Users\172049\.jenkins\workspace\MplusPlus_Main\Maven\mplusplus_internal_jars doesn't exist
Cleaning local Directory Maven\mplusplus_internal_jars
Checking out svn://10.23.156.60/MplusPlus/Source/1_0/1_0/Branch/Branch_MplusPlus_2_5/mplusplus_internal_jars at revision '2020-07-18T16:33:36.648+0530'—quiet
ERROR: Failed to check out svn://10.23.156.60/MplusPlus/Source/1_0/1_0/Branch/Branch_MplusPlus_2_5/mplusplus_internal_jars
org.tmatesoft.svn.core.SVNException: svn: E210003: No route to host: connect
at org.tmatesoft.svn.core.internal.wc.SVNErrorManager.error(SVNErrorManager.java:91)
at org.tmatesoft.svn.core.internal.wc.SVNErrorManager.error(SVNErrorManager.java:75)
at org.tmatesoft.svn.core.internal.io.svn.SVNPlainConnector.open(SVNPlainConnector.java:65)
at org.tmatesoft.svn.core.internal.io.svn.SVNConnection.open(SVNConnection.java:79)
at org.tmatesoft.svn.core.internal.io.svn.SVNRepositoryImpl.openConnection(SVNRepositoryImpl.java:1282)
at org.tmatesoft.svn.core.internal.io.svn.SVNRepositoryImpl.getLatestRevision(SVNRepositoryImpl.java:173)
at org.tmatesoft.svn.core.internal.wc16.SVNBasicDelegate.getRevisionNumber(SVNBasicDelegate.java:480)
at org.tmatesoft.svn.core.internal.wc16.SVNBasicDelegate.getLocations(SVNBasicDelegate.java:833)

at
org.tmatesoft.svn.core.internal.wc16.SVNBasicDelegate.
   createRepository(SVNBasicDelegate.java:527)
at
org.tmatesoft.svn.core.internal.wc16.SVNUpdateClient
   16.doCheckout(SVNUpdateClient16.java:875)
at
org.tmatesoft.svn.core.internal.wc2.old.SvnOld Check-
   out.run(SvnOldCheckout.java:66)
at
org.tmatesoft.svn.core.internal.wc2.old.SvnOld Check-
   out.run(SvnOldCheckout.java:18)
at
org.tmatesoft.svn.core.internal.wc2.SvnOperation Run-
   ner.run(SvnOperationRunner.java:21)
at
org.tmatesoft.svn.core.wc2.SvnOperationFactory.run
   (SvnOperationFactory.java:1239)
at org.tmatesoft.svn.core.wc2.SvnOperation.run(SvnOp-
   eration.java:294)
at
hudson.scm.subversion.CheckoutUpdater$Subversion-
   UpdateTask.perform(CheckoutUpdater.java:130)
. . .
at
org.tmatesoft.svn.core.wc2.SvnOperationFactory.run
   (SvnOperationFactory.java:1239)
at org.tmatesoft.svn.core.wc2.SvnOperation.run(SvnOp-
   eration.java:294)
3. Type of Logfile—Testing logs, Format type—.html file
Information contained in the log files:
!DOCTYPE html>
<html>
<head>
<!--
ExtentReports Library 2.41.1|http://relevantcodes.com/
   extentreports-for-selenium/|https://github.com/John-
   Doe/
. . .
Documentation: http://www.xyz.com
. . .
<span class='weight-light'><span class='s-fail-count
   weight-normal'></span>step(s) failed, <span class='s-
   others-count weight-normal'></span>others</span>
</div>
</div>
</div>

At step 204 of the method of the present disclosure, the one or more hardware processors 104 pre-process the plurality of log files to obtain a plurality of pre-processed log files (also referred as pre-processed log files and interchangeably used herein) comprising one or more unique error sentences. The pre-processing of log files includes various steps such as parsing or reading the log files, extracting information that is relevant to processing of log files for further analysis, standardizing the log files to a specific format, and performing de-duplication of the log files to eliminate duplicate log files, and the like. The duplicate log files may be obtained from various execution environments. For instance, say a log file LF1 is obtained from a distributed execution environment DEE1, a log file LF2 is obtained from another distributed execution environment DEE2 and a log file LF3 is obtained from a non-distributed execution environment NDEE1. However, it may be observed that all the log files LF1, LF2 and LF3 may contain few information or errors that are common in each other. Such information corresponds to duplicate records and are eliminated by the system 100. Post pre-processing of the log files, one or more unique error sentences (also referred as unique error sentences and interchangeably used herein) from one or more log files amongst the pre-processed log files may be obtained. The expression 'unique error sentence' refers to can error sentence that is distinct from other error sentence and has not been previously identified by the system 100. Below Table 1 illustrates exemplary one or more unique error sentences post pre-processing of the log files.

TABLE 1

| errorPID | errorFname | errorCounter | errorTime | errorDate |
|---|---|---|---|---|
| Process id: P10708069 | Error LogFile: C:\Users\abc\Downloads\Lobotv2\LOG_FILES\ CommonMaskerError_123456_P10708069_15-Oct-2020 - Copy.log | 46 | 08:52:21 | 15 Oct. 2020 |
| Process id: P1080806 | Error LogFile: C:\Users\abc\Downloads\Lobotv2\LOG_FILES\ CommonMaskerError_123456_P1080806_25-Nov-2021.log | 3 | 18:39:11 | 18 Oct. 2020 |
| Process id: P1250896 | Error LogFile: C:\Users\abc\Downloads\Lobotv2\LOG_FILES\ CommonMaskerError_123456_P250896_25-Nov-2021.log | 5 | 22:29:14 | 10 Oct. 2020 |
| Process id: P445632 | Error LogFile: C:\Users\def\Downloads\Lobotv2\LOG_FILES\ CommonMaskerError_123456_P445632_25-Nov-2021.log | 8 | 12:29:13 | 12 Oct. 2020 |
| Process id: P445632 | Error LogFile: C:\Users\def\Downloads\Lobotv2\LOG_FILES\ CommonMaskerError_123456_P445632_25-Nov-2021.log | 92 | 23:29:14 | 19 Dec. 2020 |
| Process id: P445632 | Error LogFile: C:\Users\def\Downloads\Lobotv2\LOG_FILES\ CommonMaskerError_123456_P445632_25-Nov-2021.log | 2 | 13:29:18 | 15 Oct. 2020 |
| Process id: P1060806 | Error LogFile: C:\Users\1060806\Downloads\Lobotv2\LOG_FILES\ CommonMaskerError_123456_P1060806_25-Nov-2021.log | 3 | not given in log file. | not given in log file. |

TABLE 1-continued

| errorPID | errorTitle | causeTitle |
|---|---|---|
| Process id: P10708069 | Unsupported encoding | NA |
| Process id: P1080806 | ask Data: 110 - Process failed for execution id: 22902. Schema name and catalog name is null for datasource | No cause found. please review the log file. |
| Process id: P1250896 | Failed to open writer D:\Privacy\PrivacyNew\ plugins\techniques\ Randomization\dataset\ LDs1__752693576__STRING.ds | D:\Privacy\PrivacyNew\plugins\techniques\ Randomization\dataset\LDs1__752693576__STRING.ds (The system cannot find the file specified) |
| Process id: P445632 | Failed to complete mask and export operation in batch mode. | Updating Failed for table CM50 while Inplace Masking |
| Process id: P445632 | Failed to complete mask and export operation in batch mode. | unable to rename file D:\Privacy\PrivacyNew\project\445632\ 123__P7121311\maskedFile\ Inplace__Linux__DB__New__UDRM1__FirstName__UserDefinedReplacement.dat. |
| Process id: P445632 | ask Data: 110 - Process failed for execution id: 60282. Failed to get ROWCOUNT for Table 301__11__L2Match. | No cause found. please review the log file. |
| Process id: P1060806 | relation "John.301__11__L2Match" does not exist | No cause found. please review the log file. |

At step 206 of the method of the present disclosure, the one or more hardware processors 104 tokenize the one or more unique error sentences by using a Natural Language Processing (NLP) library. In an embodiment, the NLP library is stored in the database 108 comprised in the memory 102. The NLP library is invoked by the one or more hardware processors 104 for performing tokenization of the one or more unique error sentences. The one or more unique error sentences comprise strings of characters that are tokenized. Below Table 2 illustrates exemplary tokenized unique error sentences. Such tokens serving as output from tokenization of the one or more unique error sentences shall not be construed as limiting the scope of the present disclosure.

TABLE 2

| Sl. No | String | After Tokenization (tokens) |
|---|---|---|
| 1 | 'No specific error message available for error id: ERR_EXECUTE_MASKING' | ['No', 'specific', 'error', 'message', 'available', 'for', 'error', 'id', ':', 'ERR_EXECUTE_MASKING'] |
| 2 | 'Failed to write to the file JVO6.MASK.RM.T00.RMCSTM.SAM100.MSK,' | ['Failed', 'to', 'write', 'to', 'file', 'JVO6.MASK.RM.T00.RMCSTM.SAM100.MSK,'] |
| 3 | 'Failed to complete mask & export operation in batch mode' | ['Failed', 'to', 'complete', 'mask', '&', 'export', 'operation', 'in', 'batch', 'mode'] |
| 4 | 'Failed to open writer D:\Privacy\PrivacyNew\plugins\techniques\ Randomization\dataset\LDs1__752693576__STRING.ds' | ['Failed', 'to', 'open', 'writer', 'D:\Privacy\PrivacyNew\plugins\techniques\ Randomization\dataset\LDs1__752693576__STRING.ds'] |
| 5 | 'Schema name and catalog name is null for datasource' | ['Schema', 'name', 'and', 'catalog', 'name', 'is', 'null', 'for', 'datasource'] |

At step 208 of the method of the present disclosure, the one or more hardware processors 104 remove stop words comprised in the one or more unique error sentences. Below Table 3 illustrates exemplary stop words removal, and such examples shall not be construed as limiting the scope of the present disclosure.

TABLE 3

| Sl. No | Tokens | Removal of stop words |
|---|---|---|
| 1 | ['No', 'specific', 'error', 'message', 'available', 'for', 'error', 'id', ':', 'ERR_EXECUTE_MASKING'] | ['No', 'specific', 'error', 'message', 'available', 'error', 'id', 'ERR_EXECUTE_MASKING'] |
| 2 | ['Failed', 'to', 'write', 'to', 'file', 'JVO6.MASK.RM.T00.RMCSTM.SAM100.MSK,'] | ['Failed', 'write', 'file', 'JVO6.MASK.RM.T00.RMCSTM.SAM100.MSK,'] |

TABLE 3-continued

| Sl. No | Tokens | Removal of stop words |
|---|---|---|
| 3 | ['Failed', 'to', 'complete', 'mask', '&', 'export', 'operation', 'in', 'batch', 'mode'] | ['Failed', 'complete', 'mask', 'export', 'operation' 'batch', 'mode'] |
| 4 | ['Failed', 'to', 'open', 'writer', 'D:\Privacy\PrivacyNew\plugins\techniques\Randomization\dataset\LDs1_752693576_STRING.ds'] | ['Failed', 'open', 'writer', 'D:\Privacy\PrivacyNew\plugins\techniques\Randomization\dataset\LDs1_752693576_STRING.ds'] |
| 5 | ['Schema', 'name', 'and', 'catalog', 'name', 'is', 'null', 'for', 'datasource'] | ['Schema', 'name', 'catalog', 'name', 'null', 'datasource'] |

At step 210 of the method of the present disclosure the one or more hardware processors 104 calculate a frequency of each word comprised in the one or more unique error sentences. Below illustrated are examples of word frequency:

'No': 1, 'specific': 1, 'error': 2, 'message': 1, 'available': 1, 'for': 6, 'id:ERR_EXECUTE_MASKING': 1, 'Failed': 5, 'to': 6, 'write': 1, 'the': 2, 'file': 1, 'JVO6._MASK.RM.T00.RMCSTM.SAM100.MSK,': 1, 'Either': 1, 'Recovery': 1, 'Option': 1, 'was': 1, 'not': 1, 'selected': 1, 'project': 1, 'P14325976': 1, 'while': 1, 'in-place': 1, 'masking': 1, 'or': 1, 'Clean': 1, 'Up': 1, 'action': 1, 'already': 1, 'performed.': 1, 'Hence': 1, "can't": 1, 'recover.': 1, 'ORA-00936:': 1, 'missing': 1, 'expression': 1, 'Unsupported': 1, 'encoding': 1, 'Mask': 1, 'Data:110': 1, '-': 1, 'Process': 1, 'failed': 1, 'execution': 1, 'id:22902.': 1, 'Schema': 2, 'name': 4, 'and': 2, 'catalog': 2, 'is': 2, 'null': 2, 'datasource': 2, 'open': 1, 'writer': 1. D:Privacy\\PrivacyNew\\plug ins\\techniques\\Randomization\\dataset\\LDs1_752693576_STRING.ds': 1, 'complete': 2, 'mask': 2, '&': 2, 'export': 2, 'operation': 2, 'in': 2, 'batch': 2, 'mode.': 2, 'get': 1, 'ROWCOUNT': 1, 'Table': 1, '301_11_L2Match.': 1

At step 212 of the method of the present disclosure, the one or more hardware processors 104 calculate, by using a word vector model, a word weight for each word comprised in the one or more unique error sentences based on the calculated frequency. The word weight is automatically calculated based on given knowledge database by the word vector model (e.g., also referred as word2vec model and interchangeably used herein). It is to be understood by a person having ordinary skill in the art or person skilled in the art that the word vector model itself is very complex and replication of intermediate steps will alone be very huge. Hence, the calculation of word weight is not illustrated and omitted for the sake of brevity. Below Table 4 illustrates examples of word weights calculated using the word vector model.

TABLE 4

| Word | weights |
|---|---|
| Cause | 1.9999996 |
| Title | 1.0340933 |
| /u/msk/DP/configuration/inplaceError_log4j.txt | 1.9922426 |
| (EDC5129I | 1.6978192 |
| No | 1.9991848 |
| such | 1.9999996 |
| file | 1.9834878 |
| directory | 1.9987665 |
| //'JVO6.MASK.RM.T00.RMCSTM.SAM100.MSK' | 1.5107183 |
| fwrite( ) | 1.9980458 |
| failed | 1.9999996 |

TABLE 4-continued

| Word | weights |
|---|---|
| EDC5003I | 1.9999996 |
| ... | ... |
| exist: 115326 | 1.9981335 |

At step 214 of the method of the present disclosure, the one or more hardware processors 104 generate one or more unique error sentence vectors for the one or more unique error sentences using the calculated word weight for each word. In an embodiment, the one or more unique error sentence vectors are generated based on an equation: $v(s) = a/(a+p(w))*v(w)$, where v is average number of words present in each sentence, $v(w)$ is a vector representation of a word, $p(w)$ is number of times a word has occurred by the total number of words, a is a smoothing hyper-parameter calculated based on a first pre-defined variable $\alpha$, and a second pre-defined variable z, a is (a) computed (i) based on a sum of (i) $p(w)$ and (ii) v and total number of words in the pre-defined database (e.g., the database 108 of system 100 of FIG. 1) or (b) empirically determined. In the present disclosure, the values of $\alpha=0.04838709677419355$, $a=0.6344086021505376$, and $z=31.0$. It is to be understood by a person having ordinary skill in the art or person skilled in the art that the value of $\alpha$, a and z shall not be construed as limiting the scope of the present disclosure and are subject to change based on the training data but are constant for the remaining process after training. In the present disclosure a was set to '1e-3'. $\alpha$ is either empirically computed or derived from a formula. Empirical determination is observation based, in one example embodiment of the present disclosure. Formula for alpha is described above and alpha is calculated as $alpha = sum(p(w) > threshold)/v$.

Below are exemplary error sentence vectors specific to the one or more unique error sentences comprised in the log files:

No specific error message available for error id:ERR_EXECUTE_MASKING 1.093219267204403877e-03 −1.157637452706694603e-03 2.883101347833871841e-03
−1.645658980123698711e-03
2.967183943837881088e-03
−1.78155512548983097e-03
1.266585895791649818e-03
−2.324724104255437851e-03
−3.701899666339159012e-03
−5.149022210389375687e-03
−4.243601579219102859e-03
−4.043525084853172302e-03
−2.181784249842166901e-03
2.096608048304915428e-03
−1.546526182210072875e-04

...

2.088355133309960365e-03 −6.433184607885777950e-04 −7.636090740561485291e-04
−2.836767816916108131e-04

1.925212796777486801e-03
−1.368026598356664181e-03
1.020882511511445045e-03
−5.600135773420333862e-03
−1.501560560427606106e-03
−4.134815826546400785e-04
Failed to write to the file JVO6.MASK.RM.T00.RMCSTM.SAM100.MSK,
−3.096813452430069447e-04
−2.723520388826727867e-03
1.425287919119000435e-03
1.704886926745530218e-05
−1.560071599669754505e-03
1.148213166743516922e-03
−9.480873995926231146e-05
−1.505139400251209736e-03
−5.168286152184009552e-04
−2.024535788223147392e-04
1.062977011315524578e-03
1.384696457535028458e-03
. . .
−1.278773765079677105e-03
−4.918259219266474247e-04
7.149900775402784348e-04
1.505849184468388557e-03
2.529370365664362907e-03
7.716204854659736156e-04
5.798098281957209110e-04
Either Recovery Option was not selected for the project P123475 while in-place masking or Clean Up action already performed. Hence cannot recover.
−1.225239248014986515e-03 1.047582045430317521e-04 2.840709406882524490e-03
1.318703521974384785e-03
1.538885291665792465e-03
−1.030884566716849804e-03
1.686190022155642509e-03
−2.663390478119254112e-03
7.389253587462007999e-04
. . .
−1.354076783172786236e-03 2.205115888500586152e-04 −6.530607934109866619e-04
2.478933893144130707e-04
−1.403669361025094986e-03
7.711195503361523151e-04
−8.497562957927584648e-04
ORA-00936: Missing Expression
−1.225239248014986515e-03 1.047582045430317521e-04 2.840709406882524490e-03
1.318703521974384785e-03
1.538885291665792465e-03
−1.030884566716849804e-03
1.686190022155642509e-03
−2.663390478119254112e-03
−7.389253587462007999e-04-
. . .
2.478933893144130707e-04 −1.403669361025094986e-03 7.711195503361523151e-04
−8.497562957927584648e-04
Unsupported Encoding
−1.225239248014986515e-03 1.047582045430317521e-04 2.840709406882524490e-03
1.318703521974384785e-03
1.538885291665792465e-03
−1.030884566716849804e-03
1.686190022155642509e-03
−2.663390478119254112e-03
−7.389253587462007999e-04-
. . .
2.478933893144130707e-04 −1.403669361025094986e-03 7.711195503361523151e-04
−8.497562957927584648e-04

At step 216 of the method of the present disclosure, the one or more hardware processors 104 compute a cosine similarity between the one or more unique error sentence vectors of the plurality of log files and a plurality of error sentence vectors comprised in the pre-defined database, by using a modified Smooth Inverse Frequency (mSIF) model to obtain a set of matched cosine similarities. In an embodiment, the modified Smooth Inverse Frequency (mSIF) model is obtained by: removing stops words from the plurality of error sentences by removing one or more influential non-relevant words comprised in the plurality of error sentences; calculating a frequency of each word comprised in the plurality of error sentences; calculating, by using a word vector model, a word weight for each word comprised in the plurality of error sentences based on the calculated frequency; and generating one or more error sentence vectors for the plurality of error sentences using the calculated word weight for each word to obtain the modified Smooth Inverse Frequency (mSIF) model. Stop words are a pre-defined list of non-relevant words which can be modified. For instance, is, am, are, to, etc. Present disclosure and its system 100 implemented a stop word remover function and invoked for execution and removal of these influential non-relevant words (also referred as stop words). Output results in data depicted in Table 3, column 2 (refer header "Removal of stop words" of Table 3). Below Table 5 depicts examples of cosine similarity score (also referred as cosine similarity and interchangeably used herein) between the one or more unique error sentence vectors of the plurality of log files and a plurality of error sentence vectors comprised in the pre-defined database

TABLE 5

| Input | Prediction | score |
| --- | --- | --- |
| Unsupported Encoding | Unsupported Encoding | 1.00 |
| Unsupported Encoding | ORA-00936: missing expression | 0.11 |
| Failed to write to the file abc.txt | Failed to write to the file JVO6.MASK.RM.T00.RMCSTM.SAM100.MSK, | 0.86 |
| Failed to write to the file abc.txt | Failed to get ROWCOUNT for Table 301_11_L2Match. | 0.35 |
| Failed to write to the file abc.txt | Failed to complete mask & export operation in batch mode. | 0.32 |
| Failed to write to the file abc.txt | Failed to open writer D:\Privacy\PrivacyNew\plugins\techniques\Randomization\dataset\LDs1_752693576_STRING.ds | 0.55 |

At step 218 of the method of the present disclosure, the one or more hardware processors 104 perform a comparison of each cosine similarity comprised in the set of matched cosine similarities with a pre-defined threshold value. In an embodiment, the cosine similarity is computed as a simple mean of projection weight vectors of the one or more unique error sentences and the one or more error sentence vectors for each sentence vector comprised in the pre-defined database. Below Table 6 depicts exemplary comparison of each cosine similarity comprised in the set of matched cosine similarities with the pre-defined threshold value.

TABLE 6

| Input | Prediction | score | Threshold (0.8) |
|---|---|---|---|
| Unsupported Encoding | Unsupported Encoding | 1.00 | matched |
| Unsupported Encoding | ORA-00936: missing expression | 0.11 | Not matched |
| Failed to write to the file abc.txt | Failed to write to the file JVO6.MASK.RM.T00.RMCSTM.SAM100.MSK, | 0.86 | matched |
| Failed to write to the file abc.txt | Failed to get ROWCOUNT for Table 301__11__L2Match. | 0.35 | Not matched |
| Failed to write to the file abc.txt | Failed to complete mask & export operation in batch mode. | 0.32 | Not matched |
| Failed to write to the file abc.txt | Failed to open writer D:\Privacy\PrivacyNew\plugins\techniques\Randomization\dataset\LDs1__752693576__STRING.ds | 0.55 | Not matched |

In an embodiment, the pre-defined threshold value may also be empirically determined during the analysis of log files for generating/identifying solutions.

At step 220 of the method of the present disclosure, the one or more hardware processors 104 identify one or more solutions (also referred as solutions and interchangeably used herein) to the one or more unique error sentences based on the comparison. In an embodiment, the one or more of solutions are identified for the one or more unique error sentences when the cosine similarity is greater than or equal to the pre-defined threshold value. Below Table 7 illustrates examples of cosine similarity greater than or equal to the threshold value:

TABLE 7

| Sl. No | Input | Predicted | score |
|---|---|---|---|
| 1 | Failed to write to the file abc.txt | Failed to write to the file JVO6.MASK.RM.T00.RMCSTM.SAM100.MSK, | 0.999999940395355 |
| 2 | Failed to write to the file JVO6.MASK.RM.T00.RMCSTM.SAM100.MSK, | Failed to write to the file JVO6.MASK.RM.T00.RMCSTM.SAM100.MSK, | 0.999999940395355 |
| 3 | No specific error message available for error id | No specific error message available for error id: ERR__EXECUTE__MASKING | 0.946844935417175 |
| 4 | Failed to open writer xyz.ds | Failed to open writer D:\Privacy\PrivacyNew\plugins\techniques\Randomization\dataset\LDs1__752693576__STRING.ds | 0.903943061828613 |
| 5. | Process failed for execution id: 22902. Schema name and catalog name is null for datasource | Mask Data: 110 - Process failed for execution id: 22902. Schema name and catalog name is null for datasource | 0.956844935417175 |

Examples of solutions generated and/or identified by the one or more hardware processors 104 are shown in below Table 8:

TABLE 8

| errorPID | errorFname | errorCounter | errorTitle |
|---|---|---|---|
| Process id: P10708069 | Error LogFile: C:\Users\abc\Downloads\Lobotv2\LOG__FILES\CommonMaskerError__123456__P10708069__15-Oct-2020 - Copy.log | 46 | Unsupported encoding |
| Process id: P445632 | Error LogFile: C:\Users\def\Downloads\Lobotv2\LOG__FILES\CommonMaskerError__123456__P445632__25-Nov-2021.log | 2 | ask Data: 110 - Process failed for execution id: 22902. Schema name and catalog name is null for datasource |

TABLE 8-continued

| Process id: P1060806 | Error LogFile: C:\Users\1894632\Downloads\Lobotv2\LOG_FILES\ CommonMaskerError_123456_P1060806_25-Nov-2021.log | 2 | Failed to open writer D:\Privacy\PrivacyNew\plugins\techniques\ Randomization\dataset\LDs1_752693576_STRING.ds |
| --- | --- | --- | --- |
| Process id: P1060806 | Error LogFile: C:\Users\1894632\Downloads\Lobotv2\LOG_FILES\ CommonMaskerError_123456_P1060806_25-Nov-2021.log | 2 | Failed to complete mask & export operation in batch mode. |
| Process id: P1060806 | Error LogFile: C:\Users\1894632\Downloads\Lobotv2\LOG_FILES\ CommonMaskerError_123456_P1060806_25-Nov-2021.log | 2 | Failed to complete mask & export operation in batch mode. |

| errorPID | causeTitle | errorSolution |
| --- | --- | --- |
| Process id: P10708069 | | Please check datasource encoding and update accordingly in product |
| Process id: P445632 | No cause found. please review the log file. | Please check datasource details if schema name and catalog both are null, please connect with product Support team |
| Process id: P1060806 | D:\Privacy\PrivacyNew\plugins\techniques\ Randomization\dataset\LDs1_752693576_STRING.ds (The system cannot find the file specified) | Please check dataset file at given location. Upload dataset in jobflow configuration. |
| Process id: P1060806 | Updating Failed for table CM50 while Inplace Masking | Please check database connectivity. If able to connect to the database check whether user is having permission to update table. Also check unique or primary constraint. |
| Process id: P1060806 | unable to rename file D:\Privacy\PrivacyNew\project\P7112806\123456_P7112806\maskedFile\ Inplace_Linux_DB_New_UDRM1_FirstName_UserDefinedReplacement.dat. | Please check permission on given location to rename file. |

In an embodiment, the solutions generated or identified may be in real-time, near-real time. or offline after obtaining the log files at a specific time instance/interval.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Present disclosure provides systems and methods for identifying solutions to errors comprised in log files obtained from various execution environments to overcome the various (business) challenges. More specifically, the system 100 has an option wherein users may provide inputs such as identifiers and based on the identifiers the system 100 captures the different log files and chunks the data to divide the large log file (on average hundreds/thousands of lines and to say x MB log file) data into small processable units of data. The chunked units are further mined and parsed to extract the minute identifier related details such as title, description, position, module of occurrence, file path, timestamp, etc. which are again customizable as input and can be added or removed based on need. The parsed data is then standardized and de-duplicated while retaining the frequency of the unique identifier (e.g., also referred as unique error sentences or unique error records) related data across the distributed/non-distributed environment. Post completion, the processed data is stored in a structured format for easy retrieval. The MSiF/mSIF model as implemented by the system and method described herein is an artificial intelligence-based model or machine learning based model that is initiated to train on error database information. The mSIF model creates training data by converting the error records into vector formats using the Modified Smooth Inverse Frequency methodology. The training may happen in periodic manner whenever there is an update on unique error sentences. The MSiF model converts the unique identifier related data into vectors and provide the best possible similarity solutions with the error sentences.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising:
   obtaining, via one or more hardware processors, a plurality of log files from at least one of a first execution environment and a second execution environment, wherein the first execution environment is a distributed execution environment and the second execution environment is a non-distributed execution environment, wherein in the distributed execution environment, an application is deployed on multiple machines and testing is performed for all instances simultaneously, and accordingly the log files are generated for varied test cases on multiple machines and belong to a single testing execution cycle, wherein in the non-distributed execution environment, the application is deployed and tested on a single machine, and the logs files are generated from the single machine, wherein the plurality of log files correspond to one or more file formats;
   pre-processing, via the one or more hardware processors, the plurality of log files to obtain a plurality of pre-processed log files further comprising one or more unique error sentences;
   associating, via the one or more hardware processors, the unique error sentences with corresponding attributes including an error ID, an error name, an error counter, an error time, an error date, an error title, and a cause title, wherein the error ID provide details of process ID in a unique error sentence, the error name provide details of directory of a pre-processed log file, the error title provide details of reasoning of the error in the unique error sentence, and the cause title provide one of (a) absence of cause followed by suggestion to review the pre-processed log file, (b) failed to locate the pre-processed log file, and (c) failed to update or rename the pre-processed log file;
   tokenizing, via the one or more hardware processors, the one or more unique error sentences by using a Natural Language Processing (NLP) library;
   removing, via the one or more hardware processors, stop words comprised in the one or more unique error sentences;
   calculating, via the one or more hardware processors, a frequency of each word comprised in the one or more unique error sentences;
   calculating, by using a word vector model via the one or more hardware processors, a word weight for each word comprised in the one or more unique error sentences based on the calculated frequency;
   generating, via the one or more hardware processors, one or more unique error sentence vectors for the one or more unique error sentences using the calculated word weight for each word;
   computing, via the one or more hardware processors, a cosine similarity between the one or more unique error sentence vectors of the plurality of log files and a plurality of error sentence vectors comprised in a pre-defined database, by using a modified Smooth Inverse Frequency (mSIF) model to obtain a set of matched cosine similarities, wherein the mSIF model is an artificial intelligence (AI) based model initiated to train on error database information, wherein the mSIF model creates training data by converting unique error sentences into unique error sentence vectors, and trains in a periodic manner when there is an update on the unique error sentences;
   performing, via the one or more hardware processors, a comparison of each cosine similarity comprised in the set of matched cosine similarities with a pre-defined threshold value;
   identifying, via the one or more hardware processors, one or more solutions to the one or more unique error sentences based on the comparison, and
   providing, via the one or more hardware processors, the one or more solutions as suggestions including one of (a) check datasource encoding, (b) check datasource details when schema name and catalog are null, and (c) check permission of a user to update a table in the pre-defined database.

2. The processor implemented method of claim 1, wherein the first execution environment and the second execution environment are different from each other.

3. The processor implemented method of claim 1, wherein the one or more solutions are identified for the one or more unique error sentences when the cosine similarity is greater than or equal to the pre-defined threshold value.

4. The processor implemented method of claim 1, wherein the one or more unique error sentence vectors are generated based on an equation: $v(s)=a/(a+p(w))*v(w)$, wherein v is average number of words present in each sentence, $v(w)$ is a vector representation of a word, $p(w)$ is number of times a word has occurred by the total number of words, a is a smoothing hyper-parameter that is calculated based on a first pre-defined variable $\alpha$, and a second pre-defined variable z, $\alpha$ is (a) computed based on a sum of (i) $p(w)$ and (ii) v and total number of words in the pre-defined database, or (b) empirically determined.

5. The processor implemented method of claim 1, wherein the cosine similarity is computed as a simple mean of projection weight vectors of the one or more unique error sentences and the one or more unique error sentence vectors for each error sentence vector comprised in the pre-defined database.

6. The processor implemented method of claim 1, wherein the modified Smooth Inverse Frequency (mSIF) model is obtained by:
   removing stops words from the plurality of error sentences by removing one or more influential non-relevant words comprised in the plurality of error sentences;
   calculating a frequency of each word comprised in the plurality of error sentences;
   calculating, by using a word vector model, a word weight for each word comprised in the plurality of error sentences based on the calculated frequency; and
   generating one or more error sentence vectors for the plurality of error sentences using the calculated word weight for each word to obtain the modified Smooth Inverse Frequency (mSIF) model.

7. The processor implemented method of claim 1, further comprising:
   capturing the plurality of log files pertaining to identifiers obtained from a user;
   dividing the plurality of log files into processable units of data;
   extracting details of the identifiers including a title, a description, a position, a module of occurrence, a file path, and a timestamp; and
   de-duplicating of the plurality of log files while retaining a frequency of the unique error sentences across the distributed execution environment and the non-distributed execution environment.

8. A system, comprising:
   a memory storing instructions;
   one or more communication interfaces; and
   one or more hardware processors coupled to the memory via the one or more communication interfaces, wherein the one or more hardware processors are configured by the instructions to:
      obtain a plurality of log files from at least one of a first execution environment and a second execution environment, wherein the first execution environment is a distributed execution environment and the second execution environment is a non-distributed execution environment, wherein in the distributed execution environment, an application is deployed on multiple machines and testing is performed for all instances simultaneously, and accordingly the log files are generated for varied test cases on multiple machines and belong to a single testing execution cycle, wherein in the non-distributed execution environment, the application is deployed and tested on a single machine, and the logs files are generated from the single machine, wherein the plurality of log files correspond to one or more file formats;
      pre-process the plurality of log files to obtain a plurality of pre-processed log files further comprising one or more unique error sentences;
      associate the unique error sentences with corresponding attributes including an error ID, an error name, an error counter, an error time, an error date, an error title, and a cause title, wherein the error ID provide details of process ID in a unique error sentence, the error name provide details of directory of a pre-processed log file, the error title provide details of reasoning of the error in the unique error sentence, and the cause title provide one of (a) absence of cause followed by suggestion to review the pre-processed log file, (b) failed to locate the pre-processed log file, and (c) failed to update or rename the pre-processed log file;
      tokenize the one or more unique error sentences by using a Natural Language Processing (NLP) library;
      remove stop words comprised in the one or more unique error sentences;
      calculate a frequency of each word comprised in the one or more unique error sentences;
      calculate, by using a word vector model, a word weight for each word comprised in the one or more unique error sentences based on the calculated frequency;
      generate one or more unique error sentence vectors for the one or more unique error sentences using the calculated word weight for each word;
      compute a cosine similarity between the one or more unique error sentence vectors of the plurality of log files and a plurality of error sentence vectors comprised in a pre-defined database, by using a modified Smooth Inverse Frequency (mSIF) model to obtain a set of matched cosine similarities, wherein the mSIF model is an artificial intelligence (AI) based model initiated to train on error database information, wherein the mSIF model creates training data by converting unique error sentences into unique error sentence vectors, and trains in a periodic manner when there is an update on the unique error sentences;
      perform a comparison of each cosine similarity comprised in the set of matched cosine similarities with a pre-defined threshold value;
      identify one or more solutions to the one or more unique error sentences based on the comparison, and
      provide the one or more solutions as suggestions including one of (a) check datasource encoding, (b) check datasource details when schema name and catalog are null, and (c) check permission of a user to update a table in the pre-defined database.

9. The system of claim 8, wherein the first execution environment and the second execution environment are different from each other.

10. The system of claim 8, wherein the one or more solutions are identified for the one or more unique error sentences when the cosine similarity is greater than or equal to the pre-defined threshold value.

11. The system of claim 8, wherein the one or more unique error sentence vectors are generated based on an equation: $v(s)=a/(a+p(w))*v(w)$, wherein v is average number of words present in each sentence, v(w) is a vector representation of a word, p(w) is number of times a word has occurred by the total number of words, a is a smoothing hyper-parameter that is calculated based on a first pre-defined variable $\alpha$, and a second pre-defined variable z, $\alpha$ is (a) computed based on a sum of (i) p(w) and (ii) v and total number of words in the pre-defined database, or (b) empirically determined.

12. The system of claim 8, wherein the cosine similarity is computed as a simple mean of projection weight vectors of the one or more unique error sentences and the one or more unique error sentence vectors for each error sentence vector comprised in the pre-defined database.

13. The system of claim 8, wherein the modified Smooth Inverse Frequency (mSIF) model is obtained by:
   removing stops words from the plurality of error sentences by removing one or more influential non-relevant words comprised in the plurality of error sentences;
   calculating a frequency of each word comprised in the plurality of error sentences;
   calculating, by using a word vector model, a word weight for each word comprised in the plurality of error sentences based on the calculated frequency; and
   generating one or more error sentence vectors for the plurality of error sentences using the calculated word weight for each word to obtain the modified Smooth Inverse Frequency (mSIF) model.

14. The system of claim 8, wherein the one or more hardware processors are further configured to:
   capture the plurality of log files pertaining to identifiers obtained from a user;
   divide the plurality of log files into processable units of data;
   extract details of the identifiers including a title, a description, a position, a module of occurrence, a file path, and a timestamp; and
   de-duplicate of the plurality of log files while retaining a frequency of the unique error sentences across the distributed execution environment and the non-distributed execution environment.

15. One or more non-transitory machine-readable information storage mediums comprising one or more instructions which when executed by one or more hardware processors cause:
   obtaining a plurality of log files from at least one of a first execution environment and a second execution environment, wherein the first execution environment is a distributed execution environment and the second execution environment is a non-distributed execution environment, wherein in the distributed execution environment, an application is deployed on multiple machines and testing is performed for all instances simultaneously, and accordingly the log files are generated for varied test cases on multiple machines and belong to a single testing execution cycle, wherein in the non-distributed execution environment, the application is deployed and tested on a single machine, and the logs files are generated from the single machine, wherein the plurality of log files correspond to one or more file formats;
   pre-processing the plurality of log files to obtain a plurality of pre-processed log files further comprising one or more unique error sentences;
   associating the unique error sentences with corresponding attributes including an error ID, an error name, an error counter, an error time, an error date, an error title, and a cause title, wherein the error ID provide details of process ID in a unique error sentence, the error name provide details of directory of a pre-processed log file, the error title provide details of reasoning of the error in the unique error sentence, and the cause title provide one of (a) absence of cause followed by suggestion to review the pre-processed log file, (b) failed to locate the pre-processed log file, and (c) failed to update or rename the pre-processed log file;
   tokenizing the one or more unique error sentences by using a Natural Language Processing (NLP) library;
   removing stop words comprised in the one or more unique error sentences;
   calculating a frequency of each word comprised in the one or more unique error sentences;
   calculating, by using a word vector model, a word weight for each word comprised in the one or more unique error sentences based on the calculated frequency;
   generating one or more unique error sentence vectors for the one or more unique error sentences using the calculated word weight for each word;
   computing a cosine similarity between the one or more unique error sentence vectors of the plurality of log files and a plurality of error sentence vectors comprised in a pre-defined database, by using a modified Smooth Inverse Frequency (mSIF) model to obtain a set of matched cosine similarities, wherein the mSIF model is an artificial intelligence (AT) based model initiated to train on error database information, wherein the mSIF model creates training data by converting unique error sentences into unique error sentence vectors, and trains in a periodic manner when there is an update on the unique error sentences;
   performing a comparison of each cosine similarity comprised in the set of matched cosine similarities with a pre-defined threshold value;
   identifying one or more solutions to the one or more unique error sentences based on the comparison, and
   providing the one or more solutions as suggestions including one of (a) check datasource encoding, (b) check datasource details when schema name and catalog are null, and (c) check permission of a user to update a table in the pre-defined database.

16. The one or more non-transitory machine-readable information storage mediums of claim 15, wherein the first execution environment and the second execution environment are different from each other.

17. The one or more non-transitory machine-readable information storage mediums of claim 15, wherein the one or more solutions are identified for the one or more unique error sentences when the cosine similarity is greater than or equal to the pre-defined threshold value.

18. The one or more non-transitory machine-readable information storage mediums of claim 13, wherein the one or more unique error sentence vectors are generated based on an equation: $v(s)=a/(a+p(w))*v(w)$, wherein v is average number of words present in each sentence, v(w) is a vector representation of a word, p(w) is number of times a word has occurred by the total number of words, a is a smoothing hyper-parameter that is calculated based on a first pre-defined variable $\alpha$, and a second pre-defined variable z, $\alpha$ is (a) computed based on a sum of (i) p(w) and (ii) v and total number of words in the pre-defined database, or (b) empirically determined.

19. The one or more non-transitory machine-readable information storage mediums of claim 15, wherein the cosine similarity is computed as a simple mean of projection weight vectors of the one or more unique error sentences and the one or more unique error sentence vectors for each error sentence vector comprised in the pre-defined database.

20. The one or more non-transitory machine-readable information storage mediums of claim 15, wherein the modified Smooth Inverse Frequency (mSIF) model is obtained by:
- removing stops words from the plurality of error sentences by removing one or more influential non-relevant words comprised in the plurality of error sentences;
- calculating a frequency of each word comprised in the plurality of error sentences;
- calculating, by using a word vector model, a word weight for each word comprised in the plurality of error sentences based on the calculated frequency; and
- generating one or more error sentence vectors for the plurality of error sentences using the calculated word weight for each word to obtain the modified Smooth Inverse Frequency (mSIF) model.

* * * * *